US012206909B2

(12) United States Patent
Spizig

(10) Patent No.: US 12,206,909 B2
(45) Date of Patent: Jan. 21, 2025

(54) METHOD FOR A PROVISION OF DATA

(71) Applicant: Robert Bosch GmbH, Stuttgart (DE)

(72) Inventor: Claus Spizig, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 36 days.

(21) Appl. No.: 18/338,192

(22) Filed: Jun. 20, 2023

(65) Prior Publication Data

US 2023/0421818 A1 Dec. 28, 2023

(30) Foreign Application Priority Data

Jun. 24, 2022 (DE) ..................... 10 2022 206 378.3

(51) Int. Cl.
*G06F 3/06* (2006.01)
*B60W 50/14* (2020.01)
*H04N 19/184* (2014.01)
*H04N 19/467* (2014.01)
*H04N 19/86* (2014.01)

(52) U.S. Cl.
CPC ............. *H04N 19/86* (2014.11); *B60W 50/14* (2013.01); *G06F 3/067* (2013.01); *H04N 19/184* (2014.11); *H04N 19/467* (2014.11); *B60W 2556/00* (2020.02)

(58) Field of Classification Search
CPC ....................................... G06F 3/067
See application file for complete search history.

(56) References Cited

U.S. PATENT DOCUMENTS

2018/0299890 A1* 10/2018 Ewert .................. B60W 50/14

* cited by examiner

*Primary Examiner* — Y Lee
(74) *Attorney, Agent, or Firm* — NORTON ROSE FULBRIGHT US LLP; Gerard A. Messina

(57) ABSTRACT

A method for a provision of data. The method includes the following steps carried out in an automated manner: ascertaining the data in a vehicle; carrying out a preparation of the ascertained data, in which a data portion of the data is removed and an artificially generated and reproducible replacement portion is defined by an item of replacement information as an approximation of the removed data portion in order to prepare the data for lossless data compression; carrying out the data compression of the prepared data; initiating a transmission of the data compressed by the data compression via a mobile radiotelephone network, in which the replacement information is transmitted instead of the data portion.

13 Claims, 1 Drawing Sheet

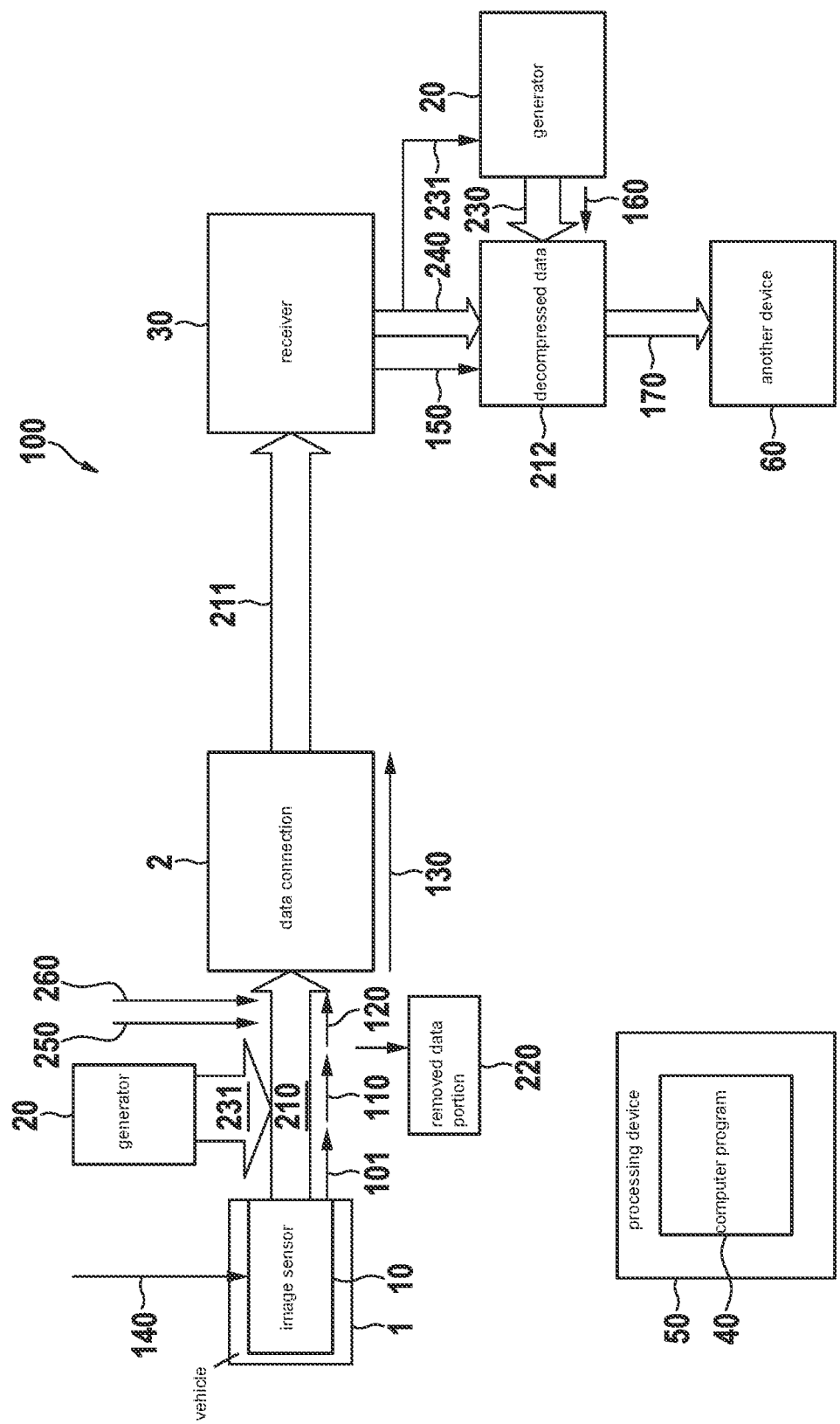

METHOD FOR A PROVISION OF DATA

FIELD

The present invention relates to a method for a provision of data. Furthermore, the present invention relates to a computer program and to a device for this purpose.

BACKGROUND INFORMATION

It is described in the related art that in a vehicle, data connected to vehicle functions such as a driver assistance system may be continuously acquired and stored. For example, these data include information about an environment of the vehicle, in particular recordings of images from at least one camera of the vehicle. In addition, the data may also include other information acquired in the vehicle. Among other things, the data enable a reproduction of driving situations and an optimization of the driving assistant. As soon as access to a broadband connection is available, such as a data cable or WLAN, the data can therefore be read out via this connection. In contrast, if only a mobile network connection is available, it is often not possible for all relevant data to be able to be transmitted, as the amount of data that can be transmitted is limited by the bandwidth of the data connection.

Furthermore, various methods of data compression are described in the related art. This makes it possible to compress the amount of data through data compression, but only to a limited extent. A problem is, e.g., that effective but lossy compression can falsify the data. A lossless data compression, on the other hand, is often not sufficient to be able to transmit the desired data completely.

Lossless data compression here describes methods in which a bit-identical copy of the original can be reproduced. Nevertheless, with lossless data compression the compression ratio is low. On the other hand, lossy data compression methods offer stronger compression, but do not allow bit-identical reconstruction.

SUMMARY

An object of the present invention is to provide a method having, a computer program, and an apparatus for the provision of data. Further features and details of the present invention are apparent from the disclosure herein. Features and details described in connection with the method according to the present invention of course also apply in connection with the computer program according to the present invention as well as the device according to the present invention, and vice versa in each case, so that with regard to the disclosure of the individual aspects of the present invention, mutual reference is or can always be made.

A method according to the present invention is advantageously used for a provision of data, in particular in a vehicle, wherein preferably the provision takes place for a transmission via a data connection. The vehicle can be for example a motor vehicle and/or a passenger vehicle and/or a truck and/or an autonomous vehicle. The vehicle can have a device according to the present invention in order to carry out, using the device, the method according to the present invention in an automated and repeated manner. Furthermore, it is optionally possible within the scope of the present invention for a vehicle function to be executed through a processing of the data, and preferably for the vehicle function to be a driver assistance system of the vehicle.

In particular, it is provided that in the method according to an example embodiment of the present invention, the following steps are carried out in an automated manner, preferably one after the other in the indicated sequence and/or repeatedly during an operation of the vehicle:

Ascertaining the data in a, or the, vehicle, the data preferably being ascertained by an acquisition device of the vehicle, and preferably subsequently being stored and/or temporarily stored in the vehicle in a volatile or non-volatile manner, Carrying out a preparation of the determined data, in particular in the form of a digital data processing of the data, wherein preferably during the preparation a (first) data portion of the data is removed, and preferably a second data portion of the data is retained, and preferably an artificially generated and/or reproducible replacement portion is defined as an approximation of the removed (first) data portion by an item of replacement information, in order to prepare the data for a data compression, Carrying out data compression of the prepared data, in particular the remaining second data portion and, if warranted, also the replacement information, but not the removed first data portion, in order to obtain therefrom data compressed by the data compression, Initiating and/or carrying out a transmission of the data compressed by the data compression, preferably via a data connection, preferably via a mobile radiotelephone network, in which advantageously the replacement information is transmitted instead of the data portion.

This may yield an advantage that more and more relevant data can be transmitted, even if the data connection used for this purpose is only a connection having lower bandwidth, such as a mobile radiotelephone connection. The data can here be compressed to a much higher degree than is possible with many conventional methods. At the same time, falsification of the data can be avoided, since the (first) data portion is not merely removed, but rather a replacement portion is additionally provided as an approximation of the removed data portion.

The replacement portion can be artificially generated and/or reproducible. This means that the replacement portion is not obtained from a modification or alteration of the data portion, but can be generated completely artificially even without knowledge of the data portion, using the replacement information. For this purpose, a generator such as a random number generator is used, which can generate the replacement portion, e.g., as a matrix or vector of random numbers, on the basis of the replacement information, such as a seed. This has the advantage that the replacement portion itself does not have to be transmitted, but only the replacement information. The replacement information can here be only a key, such as a seed key, and can thus have a much smaller data size of a few bits compared to the replacement portion and the removed data portion. For example, the replacement information has max. 1% of the data size of the replacement portion and/or the removed data portion.

Further, within the scope of the present invention, it is possible that the (first, removed) data portion is a noise portion of the data and/or the replacement portion is an artificially generated noise, in particular a pseudo-noise. The removed data portion can be a particular portion of the data, which can be characterized and selected according to predefined and, in particular, statistical criteria. When the data portion is removed, the prepared data may include only the portion of the data remaining after the removal. (In the context of the present invention, the removed data portion is also referred to as the first data portion, and the remaining portion as the second data portion.) The remaining portion can have the relevant information content, e.g., a recording of an environment of the vehicle. In contrast, the removed data portion can have a lower and predominantly random information content, e.g., as noise representing merely statistically distributed energy.

It can be provided within the scope of the present invention that the data compressed by the data compression as well as the replacement portion are reproduced in bit-identical fashion on the basis of the replacement information after the transmission, the data compression preferably being carried out in the form of a lossless data compression for this purpose. However, in combination with the preparation, a lossy data compression of the data may still result, because here the data portion is removed and the lossless data compression is applied only to the remaining portion of the data. "Bit-identical" means in particular that each bit of the data can be reproduced identically and thus without loss.

In particular, it is one feature of the present invention that through a removal of the data portion, in particular the noise portion, of the data, a much higher compression can be achieved than would be the case with conventional methods. Since the removed data portion can have a rather random and statistically distributed information content, only an inefficient compression would be possible. Due to the predominantly random content of the removed data portion, this portion can be statistically approximated instead, thus enabling a substitution by the artificially generated replacement portion. In contrast, the data portion remaining after the removal cannot be statistically replicated due to the predominantly non-random information content, but can nevertheless be better compressed due to the extensive redundant information. In other words, the determined data may consist of a random first data portion, especially noise, and a second data portion with a high proportion of redundant information. If the data are in the form of image data, the first data portion can be the (superimposed) noise portion of the image, and the second data portion can be the remaining portion of the image after subtracting the noise. This can also hold for each pixel of the image; this can be made up of the first (random, noise) and second (redundant) data portion. The in particular lossless data compression can be applied to the second (redundant) data portion. The first data portion, on the other hand, can be replaced by the replacement portion, in particular based on a noise model. Since the replacement portion does not have to be transmitted, but can be reproduced bit-identically using the replacement information, the data size to be transmitted is reduced. Although the replacement portion (only) approximately corresponds to the data portion, the original data portion is irretrievably lost, so that this procedure can also be understood as lossy data compression. In other words, this lossy data compression for the first data portion is combined with the lossless data compression for the second data portion. This allows a compressed quantity of data to be transmitted.

Since the first data portion is removed, and moreover is not reproducible, the method according to the present invention may include a lossy data compression, in which the first data portion is lost but the remaining second data portion may be compressed losslessly. To avoid falsification of the data, a replacement portion can be generated instead of the data portion. After transmission, the replacement portion can be reproduced without loss, in particular bit-identically, and reimpressed on the transmitted data. For example, a reproducible pseudo-noise can be used as the replacement portion. Here, although the replacement portion does not replace the removed data portion bit-identically, it does come very close to it. Through this impressing of reproducible pseudo-noise, a strong compression factor can be achieved. The remaining portion of the data as well as the replacement portion can be reproduced bit-identically after the transmission. If the removed data portion is a noise portion of the data, replacing the noise portion with the replacement portion can also be referred to as a noise substitution. Noise substitution allows the greatest portion of the random noise in the data, which can be characterized by an input noise model, to be replaced by the pseudo-noise, which is characterized by a target noise model.

In addition, it is possible within the scope of the present invention for the replacement portion to be defined by specifying the replacement information, in particular a seed key for a generator such as a random number generator, the replacement portion preferably being subsequently reproduced by the replacement information, in particular after the transmission of the data. The replacement information thus unambiguously defines the replacement portion, e.g. the pseudo-noise, so that the replacement portion can be reproduced bit-identically on the basis of the replacement information. For this purpose, for example the replacement information is used by a generator, or random number generator, to generate the replacement portion in the form of a two-dimensional matrix. The seed key can be determined, for example, by measuring the noise characteristic of the (real) acquisition device. The statistical characteristic of this pseudo-noise may thus correspond to that of the noise really occurring in the acquisition device, but is bit-identically reproducible.

According to an example embodiment of the present invention, it may further be possible for an acquisition device to carry out an acquisition in an environment of the vehicle or at the vehicle, the data being determined based on the acquisition, and a vehicle function being executed through a processing of the data. Correspondingly, the data can also be in the form of sensor data, in particular image data. The acquisition device is, for example, an image sensor, and is thus suitable for carrying out a recording of camera images. The image data can be realized as image recordings. The image recordings can each include at least two- or three-dimensional images, and thus also sequences of images in the sense of video recordings and/or radar recordings and/or the like.

Advantageously, it can be provided within the scope of the present invention that the acquisition includes a recording of a content relevant for the vehicle function, in particular of objects in the environment of the vehicle, the data still including, after the removal of the data portion, a remaining portion which is specific for this relevant content, the removed data portion having on the other hand a predominantly random content which is based on at least one parameter of an acquisition device, the item of replacement information being defined based on the at least one parameter. The image data, i.e., specifically each pixel of the image data, can have a noise portion. The noise portion may have a predominantly random content, and is in particular the data portion which is removed in the method according to the present invention. The portion then remaining can be specific to the relevant content. The random content can be noise and may be based substantially on parameters of the acquisition device.

According to an example embodiment of the present invention, the acquisition device, and preferably the image sensor, can be characterized by at least one of the following parameters that influence the noise in the ascertained data, or image data, these parameters preferably defining a noise characteristic of the acquisition device:

Quantum efficiency,
Readout noise,
Black level,
Amplification (gain).

The acquisition device is for example an image sensor, e.g., a CMOS or CCD image sensor. The data, in particular image data, can also be realized as raw data of the acquisition device, in particular of the image sensor. To determine the replacement portion in such a way that it approximates the removed data portion, it can be provided that the replacement portion is generated as a function of at least one of the parameters of the acquisition device. For this purpose, the parameters are supplied to a noise model, for example.

In addition, in the context of an example embodiment of the present invention it can be provided that the ascertaining of the data includes the following step:

Carrying out of the acquisition by an image sensor, which provides the acquired data in the form of image data.

In addition, according to an example embodiment of the present invention, the carrying out of the preparation can include the following step:

Carrying out the removal of the data portion in the form of a noise portion through a noise reduction, by which the prepared data is produced in the form of noise-reduced image data.

Furthermore, according to an example embodiment of the present invention, the following steps can be carried out after the transmission:

Decompression of the transmitted data, a portion of the data remaining after the removal of the data portion being reproduced bit-identically, Generation of the replacement portion based on the replacement information, the replacement portion being reproduced bit-identically, Introducing, in particular impressing, the replacement portion into the decompressed data, thereby providing the data as an approximation of the ascertained data, Processing of the data with the introduced replacement portion, in particular for a reproduction of a recorded driving situation of the vehicle.

In this way, an optimization of the vehicle function can take place on the basis of the transmitted data.

According to an example embodiment of the present invention, it is also advantageous if the following step is carried out, in particular before the preparation is carried out:

Determining at least one parameter of a noise model on the basis of a noise characteristic of the image sensor and/or on the basis of a noise evaluation of the ascertained image data in order to define the replacement portion in the form of a pseudo-noise as an approximation of the removed noise portion.

The replacement portion can be a pseudo-random and thus artificially generated and therefore predictable noise. Here the noise can be generated by a noise model through which the unpredictable noise of the acquisition device is mimicked.

Furthermore, it is optionally possible within the scope of the present invention that carrying out the preparation includes at least one of the following steps:

Introducing at least one piece of additional information, in particular an additional bit, into the data, the additional information also being transmitted during the transmission and subsequently being verified in order to detect an error during the transmission, Introducing at least one watermark into the data, the watermark also being transmitted during the transmission, Carrying out an image enhancement and/or correction of the data, Embedding at least one item of metadata information in the data, Embedding at least one reference point in the data to verify a position of the acquiring device on the vehicle.

The data may include at least one data container, such as a container data file. The data container can include image data as well as other data such as metadata and/or the additional information and/or the replacement information and/or the like.

According to an example embodiment of the present invention, after the transmission and decompression, the supplemented additional bit can, if necessary, be compared with a reference to detect whether an error occurred during transmission. The addition of a watermark can take place in the compressed data to detect falsification by a third party. It is also possible, through comparison of the real noise (i.e. the first data portion) with the generated parameterized pseudo-noise (i.e. the replacement portion), for statements to be made about the operating point of the sensor.

The subject matter of the present invention also includes a computer program, in particular a computer program product, having instructions that, when the computer program is executed by a computer, cause the computer to carry out the method according to the present invention. Thus, the computer program according to the present invention provides the same advantages as described in detail above in relation to a method according to the present invention.

As the computer, for example a data processing device that executes the computer program can be provided. The computer can include at least one processor for executing the computer program. Also, a non-volatile data memory can be provided in which the computer program can be stored and from which the computer program can be read out by the processor for execution.

The subject matter of the present invention can also be a computer-readable storage medium having the computer program according to the present invention. The storage medium is designed, for example, as a data storage device such as a hard disk and/or a non-volatile memory and/or a memory card. The storage medium can be integrated into the computer, for example.

Furthermore, the method according to the present invention can also be realized as a computer-implemented method.

The subject matter of the present invention also includes a device for data processing that is set up to carry out the method according to the present invention. Thus, the data processing device according to the present invention provides the same advantages as described in detail above in relation to a method according to the present invention. The data processing device can optionally also be designed as a distributed data processing system that is provided partly in the vehicle and partly outside the vehicle.

Further advantages, features, and details of the present invention result from the following description, in which exemplary embodiments of the present invention are described in detail with reference to the FIGURE. The features disclosed herein can be essential to the present invention individually or in any combination.

BRIEF DESCRIPTION OF THE DRAWING

FIG. 1 shows a visualization of the steps of a method according to an example embodiment of the present invention.

In the FIGURE, identical reference signs are used for the same technical features even of different exemplary embodiments.

DETAILED DESCRIPTION OF EXAMPLE EMBODIMENTS

FIG. 1 visualizes the steps of a method 100 according to the present invention for a provision of data 210. Shown as an example is a sensing device 10, which can be realized in the form of an image sensor 10, also referred to as an imager. Image sensor 10 can be a chip with a defined resolution, frame rate, and noise characteristic. Digital images ascertained by such image sensors 10 typically contain a high degree of entropy, due in large part to sensor noise. The presence of this noise is an important aspect of what gives the image its natural statistical properties. A removal of this noise can cause processing algorithms applied to the images, e.g. in the context of a further processing 170, to provide different results than for an image that still contains this noise. Data 210 would thus be falsified. However, the presence of the noise strongly limits the data reduction achievable by a lossless compression.

In the following, it is described in more detail how higher compression rates can be achieved through the use of a replacement portion 230 while at the same time maintaining a realistic noise profile, so that content falsification can be avoided.

Acquisition device 10 can be part of a vehicle 1 and can perform an acquisition 140 in an environment of vehicle 1 or at vehicle 1 itself. Data 210 can be ascertained based on the acquisition 140 and can be for example sensor data outputted by acquisition device 10. Acquisition 140 can include a recording of content relevant to the vehicle function, in particular of objects in the environment of vehicle 1. It can further be possible to carry out a vehicle function through a processing of the data 210. A further processing 170 may also be provided outside vehicle 1 to monitor and/or optimize the performance of the vehicle function. This further processing 170 requires a transmission 130 of the data 210 to a receiver 30 via a data connection 2. For example, a mobile network 2 may provide a data connection via which data 210 are transmitted 130 as mobile data 210.

According to a first method step, the ascertaining 101 of the data 210 is carried out at the vehicle 1. The data can be temporarily stored, for example, after the acquisition 140, in order to transmit it at a later time when a data connection 2 is available. For this purpose, it can be possible to repeatedly detect whether data connection 2 is available in order to then initiate the process steps. For the transmission 130, a preparation 110 of the ascertained data 210 can be carried out, in which a data portion 220 of the data 210 is removed and an artificially generated and reproducible replacement portion 230 is defined, as an approximation of the removed data portion 220, by an item of replacement information 231, in order to prepare the data 210 for an in particular lossless data compression 120. Here, after removing data portion 220, data 210 may still include a remaining portion 240 that is particularly suitable for the lossless data compression 120.

The removed data portion 220 may also be referred to as the first data portion 220 and the remaining portion 240 may be referred to as the second data portion 240.

The step of preparing 110 can be carried out at least in part by a generator 20. Further, in this step an addition of further information to the data 210 can optionally take place, for example an item of additional information 260 and/or a watermark 250. Subsequently, data compression 120 of the prepared data 210 can be carried out and transmission 130 of the data 211 compressed by the data compression 120 can be initiated and/or carried out via the data connection 2 and preferably via a mobile network 2. Here the removed data portion 220 is not transmitted; rather, instead of the data portion 220 the replacement information 231 is transmitted together with the remaining portion 240. Here, the removed data portion 220 can be a noise portion 220 of the data 210 and the replacement portion 230 can be an artificially generated noise 230, in particular a pseudo-noise 230.

The replacement portion 230 can be defined during the preparation 110 by defining the item of replacement information 231, in particular a seed key for the generator 20 or for a random number generator 20. It is then possible to use the replacement information 231 to generate and thus reproduce the replacement portion 230, in particular after transmission 130 and decompression 150 of the data 210. For the definition and/or generation 160 of the replacement portion 230, it can also be provided that the replacement portion 230 is generated in the form of a pseudo-noise 230 by an application of the generator 20. To enable a bit-identical reproduction of the replacement portion 230, the generator 20 can be carried out with defined initial conditions, in particular as a function of a target noise model, referred to as a noise model for short. The initial conditions may be specified and transmitted by the item of replacement information 231.

Optionally, the generated pseudo-noise 230 can be added to the noise-reduced data 210, particularly image data 210, at a later time, such that the resulting pseudo-noise image accurately mimics the desired noise model. The desired noise model can be suitable to mimic the acquisition device 10 or image sensor 10.

In addition, FIG. 1 shows a computer program 40 according to the present invention for carrying out the method steps, and a data processing device 50 according to the present invention.

The removal of the data portion 220 can include removing most of the noise from the data 210, in particular the image data 210, for example by noise reduction. If necessary, corrections can also be made here, such as of sensor-specific noise, noise due to fixed patterns, or non-uniform photosensitivity. After this step, the prepared data 210 are obtained, which can also be referred to as noise-reduced data 210.

The prepared data 210 can be compressed and transmitted without loss. In this context, the data 210 can optionally include, in addition to a data content, the noise model with the at least one corresponding parameter (i.e. in particular replacement information 231, or the seed key), and preferably metadata and/or further additional information 260. The at least one parameter can be stored, e.g. using a steganographic key, in the data 210 itself or in further data or in a separate file. Lossless compression can take place for example by a factor of 5 to 10, preferably using a lossless codec defined in the JPEG2000 standard or a user-defined lossless codec. Examples are lossless JPEG or PNG compression, or also a ZIP compression. The at least one parameter of the pseudo-noise can optionally be stored along with the compressed data 210. The decompression 150 can take place by first decompressing the data 210 using the same lossless codec, and then generating the pseudo-noise based on the at least one parameter and adding it to the data 210.

In the following, an exemplary embodiment of the method steps according to the present invention are described in more detail. Here the ascertained data 210 can be in the form of image data 210 that have a plurality of pixels i with the respective values $x_i$. Here each pixel i can have the first data portion 220, i.e. the noise portion 220, and the remaining second data portion 240 with partly redundant information. This means that the two data portions 220, 240 can overlap. The removal of first data portion 220 as part of the preparation 110 of data 210 can take place for example by noise reduction. Conventional noise reduction techniques can be used for noise reduction. A noise model is usually used for this purpose. The prepared data 210 can then still include only the remaining portion 240 and the thus noise-reduced data 210. For example, a Poisson-Gaussian model can be used as a noise model, for which the estimated standard deviation $\sigma_i$ of the pixel i with the value $x_i$ is given by $\sigma_i = \sqrt{a(x_i - x_0) + b}$. Here the noise parameters for this model are a. These correlate in particular with the signal amplification in image sensor 10. The black level of image sensor 10 can be specified by $x_0$. Furthermore, b can denote a parameter related to the readout noise of image sensor 10. While this noise model is preferably suitable for CCD and CMOS raw image data, a simplified model can also be used in which it is assumed that the noise has a standard deviation $\sigma_0$ which is independent of the pixel value. In this case, the number of noise bits per pixel i for image data 210 can be calculated with integer values, as $N_{Bits} = \log_2(\sigma_0 \sqrt{12}) = \log_2(\sigma_0) + 1.792$. This number can be e.g. 6 to 8 bits. Using the noise reduction techniques, it is then possible to ascertain, for the respective values $x_i$ of the pixels i, a noise-reduced value $y_i$. For example, a pseudo-random number generator 20 with a seed S is used for this purpose, where S can be an integer, in order to generate for each pixel i a pseudo-random number $R_i$. The noise-reduced pixel values $y_i$ of the noise-reduced data 210 can be calculated, as an example, by:

$$y_i = \text{round}\left(\frac{x_i}{\frac{\sigma_0}{q}} + R_i\right).$$

In the generation of the noise-reduced data 210 using the noise reduction techniques, first data portion 220 is removed. Accordingly, first data portion 220 can designate the difference between the originally ascertained data 210 and the prepared noise-reduced data 210. Here first data portion 220 can include most of the natural noise in the ascertained data 210.

After the removal of data portion 220, replacement portion 230 can be defined. Replacement portion 230 can be a pseudo-noise 230, which should be as close as possible to the removed noise. Replacement portion 230 can be generated based on replacement information 23, in the present example a seed key. A target noise model can be used for this purpose. In the simplest case, the seed key can be arbitrarily predefined for this target noise model and can be fixedly stored for the method according to the present invention. Thus, defining replacement portion 230 does not require an additional calculation step. Alternatively, the seed key can also be calculated based on the removed data portion 220, e.g. using an optimization method to evaluate noise in removed data portion 220. Such a seed key can then be defined, which results in replacement portion 230 being as close as possible to removed data portion 220. Further, the seed key can also be defined based on the noise characteristic of acquisition device 10, in such a way that replacement portion 230 generated therefrom is as close as possible to removed data portion 220. For this purpose, the seed key can also be determined empirically or in model-based fashion, if necessary.

Remaining portion 240 can then be compressed, in particular losslessly compressed, and replacement information 23 can be transmitted to receiver 30 together with the compressed remaining portion 240.

After transmission 130, a decompression 150 of remaining portion 240 can first take place in order to obtain decompressed data 212. Subsequently, using the transmitted replacement information 231, pseudo-noise 230 can be reimpressed on remaining portion 240, for example through the following calculation of the pixel values $z_i$:

$$z_i = \text{round}\left([y_i - R_i] \cdot \frac{\sigma_0}{q}\right).$$

A noise model and its parameters are used here, the noise model being the functional form of the transformation and the parameters being the exact values for $\sigma_0$ and q. The pseudo-random number $R_i$ can be calculated by generator 20, which receives the transmitted replacement information 231 for the random number generation for this purpose. Data 210 obtained in this manner, with the pixel values $z_i$, are very close to the original ascertained data 210 and can subsequently be transmitted to another device 60 for further processing 170.

The above explanation of the specific embodiments describes the present invention by way of example only. Of course, individual features of the embodiments can be freely combined with each other, if this makes sense technically, without departing from the scope of the present invention.

What is claimed is:

1. A method for a provision of data, the method comprising the following steps carried out in an automated manner:
    ascertaining the data in a vehicle;
    carrying out a preparation of the ascertained data, in which a data portion of the data is removed, and an artificially generated and reproducible replacement portion is defined by an item of replacement information as an approximation of the removed data portion, in order to prepare the data for a data compression;
    carrying out the data compression of the prepared data; and
    initiating a transmission of the prepared data compressed by the data compression via a mobile radiotelephone network, in which the replacement information is transmitted instead of the data portion.

2. The method as recited in claim 1, wherein the data portion is a noise portion of the data and the replacement portion is an artificially generated noise including a pseudo-noise.

3. The method as recited in claim 1, wherein the data compressed by the data compression and the replacement portion are reproduced in bit-identical fashion based on the replacement information after the transmission, the data compression being a lossless data compression.

4. The method as recited in claim 1, wherein the replacement portion is defined by determining the replacement information including a seed key for a random number generator, the replacement portion being subsequently reproduced, after the transmission of the data, using the replacement information.

5. The method as recited in claim 1, wherein an acquisition device carries out an acquisition in an environment of the vehicle or at the vehicle, the data being ascertained based on the acquisition, and a vehicle function being carried out through a processing of the data.

6. The method as recited in claim 5, wherein the acquisition includes a recording of a content relevant for the vehicle function, the content including objects in the environment of the vehicle, the data still including, after the removal of the data portion, a remaining portion which is specific for the relevant content, the data portion having a predominantly random content which is based on at least one parameter of the acquisition device, the item of replacement information being defined based on the at least one parameter.

7. The method as recited in claim 5, wherein the vehicle function is a driver assistance system of the vehicle.

8. The method as recited in claim 1, wherein the ascertaining of the data includes the following step:
carrying out of the ascertaining by an image sensor, which provides the ascertained data in the form of image data;
wherein the carrying out of the preparation includes the following step:
carrying out the removal of the data portion in the form of a noise portion through a noise reduction, by which the prepared data is produced in the form of noise-reduced image data; and
wherein the following steps being carried out after the transmission:
decompressing the transmitted data, a portion of the data remaining after the removal of the data portion being reproduced bit-identically,
generating the replacement portion based on the replacement information, the replacement portion being reproduced bit-identically,
introducing the replacement portion into the decompressed data, whereby the data are provided as an approximation of the ascertained data,
processing the data with the introduced replacement portion for a reproduction of a recorded driving situation of the vehicle.

9. The method as recited in claim 8, wherein the following step is carried out before carrying out the preparation:
determining at least one parameter of a noise model based on a noise characteristic of the image sensor and/or based on a noise evaluation of the ascertained image data in order to define the replacement portion in the form of a pseudo-noise as an approximation of the removed noise portion.

10. The method as recited in claim 1, wherein the carrying out of the preparation includes the following step:
introducing at least one item of additional information including an additional bit into the data, the additional information also being transmitted during the transmission and verified in order to detect an error during the transmission.

11. The method as recited in claim 1, wherein the carrying out of the preparation includes the following step:
introducing at least one watermark into the data, the watermark also being transmitted during the transmission.

12. A non-transitory computer-readable medium on which is stored a computer program including instructions for a provision of data, the instructions, when executed by a computer, causing the computer to perform the following steps in an automated manner:
ascertaining the data in a vehicle;
carrying out a preparation of the ascertained data, in which a data portion of the data is removed, and an artificially generated and reproducible replacement portion is defined by an item of replacement information as an approximation of the removed data portion, in order to prepare the data for a data compression;
carrying out the data compression of the prepared data; and
initiating a transmission of the prepared data compressed by the data compression via a mobile radiotelephone network, in which the replacement information is transmitted instead of the data portion.

13. A device for data processing, the device being configured for a provision of data, the device being configured to carry out the following steps in an automated manner:
ascertaining the data in a vehicle;
carrying out a preparation of the ascertained data, in which a data portion of the data is removed, and an artificially generated and reproducible replacement portion is defined by an item of replacement information as an approximation of the removed data portion, in order to prepare the data for a data compression;
carrying out the data compression of the prepared data; and
initiating a transmission of the prepared data compressed by the data compression via a mobile radiotelephone network, in which the replacement information is transmitted instead of the data portion.

* * * * *